United States Patent
Chang et al.

(10) Patent No.: US 10,952,830 B2
(45) Date of Patent: Mar. 23, 2021

(54) ADJUSTABLE ASSEMBLY AND NOZZLE FOR PROVIDING VARIOUS LIQUID/AIR OUTPUT FLOW PATTERNS

(71) Applicant: KONINKLIJKE PHILIPS N.V., Eindhoven (NL)

(72) Inventors: Yu-Wen Chang, Mercer Island, WA (US); Milica Kovacevic Milivojevic, Eindhoven (NL); Valentina Lavezzo, Heeze (NL); Marco Baragona, Delft (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 505 days.

(21) Appl. No.: 15/521,726

(22) PCT Filed: Oct. 23, 2015

(86) PCT No.: PCT/IB2015/058179
§ 371 (c)(1),
(2) Date: Apr. 25, 2017

(87) PCT Pub. No.: WO2016/067170
PCT Pub. Date: May 6, 2016

(65) Prior Publication Data
US 2017/0224452 A1    Aug. 10, 2017

Related U.S. Application Data

(60) Provisional application No. 62/069,911, filed on Oct. 29, 2014.

(51) Int. Cl.
*A61C 17/028* (2006.01)
*A61C 17/02* (2006.01)
(Continued)

(52) U.S. Cl.
CPC .......... *A61C 17/028* (2013.01); *A61C 1/0015* (2013.01); *A61C 1/0092* (2013.01);
(Continued)

(58) Field of Classification Search
CPC ........ A61H 13/00; A61H 13/005; A61H 9/00; A61H 9/0021; A61H 9/0028;
(Continued)

(56) References Cited

U.S. PATENT DOCUMENTS 2,733,713 A    2/1952  Kabnick
2,986,002 A *  5/1961  Ferri ......................... F02K 1/38
                                                            239/127.3
(Continued)

FOREIGN PATENT DOCUMENTS

DE    3526579 A1    7/1986
EP    0688542 A1   12/1995
(Continued)

Primary Examiner — Colin W Stuart
Assistant Examiner — Matthew D Ziegler

(57) ABSTRACT

A oral irrigator device (10) for cleaning teeth, including a system (14) for producing a stream of liquid/air bursts and a nozzle (16) connected to the system, and through which the stream of liquid/air bursts are directed. The nozzle can include a guidance tip (26) including a base portion (30), a tip portion (28), and an orifice (31) through which the stream of liquid/air bursts exits at a flow output pattern, and a flow output pattern selection mechanism (90, 90') connected to or positioned within the guidance tip. A flow output pattern selection mechanism can be configured to be selectively actuated and to vary, upon the actuation the flow output pattern between a first flow output pattern to at least a second flow output pattern.

8 Claims, 5 Drawing Sheets

(51) Int. Cl.
*A61C 1/00* (2006.01)
*A61H 13/00* (2006.01)

(52) U.S. Cl.
CPC .......... *A61C 17/02* (2013.01); *A61C 17/0202* (2013.01); *A61C 17/0217* (2013.01); *A61H 13/005* (2013.01)

(58) Field of Classification Search
CPC .... A61H 2009/0035; A61H 2009/0042; A61H 21/00; A61H 33/00; A61H 33/0087; A61H 33/02; A61H 33/026; A61H 33/027; A61H 33/6021–6063; A61H 2033/021; A61H 2033/022; A61H 35/00–04; A61M 3/00; A61M 3/02; A61M 3/0235; A61M 3/025; A61M 3/0275; A61M 3/0279; A61M 11/00; A61M 11/002; A61M 13/00; A61M 13/003; A61M 2205/07; A61M 2205/82; A61M 2205/8206; A61M 2210/06; A61M 2210/0625

USPC ...... 239/455–458, 503, 533.12, 533.13, 519, 239/602

See application file for complete search history.

(56) References Cited

U.S. PATENT DOCUMENTS

| | | | | |
|---|---|---|---|---|
| 3,776,470 | A * | 12/1973 | Tsuchiya | A23J 3/26 239/533.13 |
| 3,874,083 | A * | 4/1975 | Buckley | A61C 17/0217 433/80 |
| 4,386,911 | A | 6/1983 | Maloney et al. | |
| 4,907,744 | A | 3/1990 | Jousson | |
| 5,772,433 | A * | 6/1998 | Esrock | A61C 17/0217 433/80 |
| 5,807,289 | A * | 9/1998 | Camp | A61H 33/0091 4/541.3 |
| 6,099,494 | A * | 8/2000 | Henniges | A61M 1/0064 601/161 |
| 6,125,843 | A * | 10/2000 | Gold | A61M 3/0275 128/200.23 |
| 7,124,964 | B2 * | 10/2006 | Bui | A01G 25/023 239/519 |
| 8,882,002 | B2 * | 11/2014 | Marino | B05B 1/3073 239/455 |
| 2007/0203437 | A1 | 8/2007 | Squillace | |
| 2007/0290063 | A1 | 12/2007 | Combs et al. | |
| 2012/0295220 | A1 | 11/2012 | Thomas et al. | |
| 2013/0089832 | A1 * | 4/2013 | Lee | A61C 17/0202 433/82 |

FOREIGN PATENT DOCUMENTS

| | | |
|---|---|---|
| JP | S63157257 U | 10/1988 |
| WO | 2013093717 A1 | 6/2013 |
| WO | 2014140979 A1 | 9/2014 |
| WO | 2015173691 A1 | 11/2015 |
| WO | 2015173698 A1 | 11/2015 |

* cited by examiner

ADJUSTABLE ASSEMBLY AND NOZZLE FOR PROVIDING VARIOUS LIQUID/AIR OUTPUT FLOW PATTERNS

CROSS-REFERENCE TO PRIOR APPLICATIONS

This application is the U.S. National Phase application under 35 U.S.C. § 371 of International Application No. PCT/IB2015/058179, filed on Oct. 23, 2015, which claims the benefit of U.S. Provisional Patent Application No. 62/069,911, filed on Oct. 29, 2014. These applications are hereby incorporated by reference herein.

FIELD OF THE INVENTION

The present disclosure is directed generally to varying a flow output pattern of liquid/air burst dental appliances.

BACKGROUND

Periodontal diseases are thought to be infectious diseases caused by bacteria present in dental plaques. Removal of dental plaques is highly important for the health of oral cavities. Dental flossing can help with reaching and cleaning areas where plaque resides (including interproximally or between teeth) that cannot be reached through tooth brushing alone. However, dental flossing can become tedious and may not effectively remove all interproximally located plaque due, in part, to the shape/structure of a user's teeth.

Liquid/air burst dental appliances designed for home use are known, and have been developed as an alternative (or at least as a complement) to flossing. Many of these conventional appliances require the user to properly locate the spray nozzle tip of the appliance relative to the teeth, so that the spray reaches the desired area of the teeth. It is a particular challenge for the user to locate the spray properly relative to the interproximal spaces between the teeth. Generally it is more difficult to position the spray tip correctly for the back teeth than for those teeth which are closer to the front, because the spray generally cannot be felt by the user and the back teeth cannot be easily seen.

Moreover, the spray tip may be positioned incorrectly when attempting to clean the interproximal regions of the teeth. Incorrect positioning can lead to reduced or poor cleaning in the interproximal areas. Certain liquid/air burst dental appliances have been developed, which include a guidance tip structure configured to provide both correct alignment and orientation of the spray tip to permit the spray to properly enter/engage the interproximal areas. However, such appliances may be more difficult to adjust while in active use.

Accordingly, there is a need in the art for liquid/air burst dental appliances that conform to, address, and are easily adjustable to clean a wide variety of unique teeth structures.

SUMMARY OF THE INVENTION

The present disclosure is directed to inventive methods and apparatus for varying a flow output pattern, and volume of liquid/air bursts through a nozzle for dynamic interproximal cleaning of teeth. Various embodiments and implementations herein are directed to an interproximal cleaning of teeth method and apparatus (or oral irrigator device) in which a system component provides a stream, such as a stream of liquid/air bursts, while a nozzle connected to the system component directs the stream of liquid/air bursts to remove plaque on a dental surface (preferably interproximal dental surface) and provides the ability to adjust or vary the flow output pattern (e.g., jet or spray pattern) of the stream of liquid/air bursts on demand while in use. In an alternative embodiment, the exit velocity can also be adjusted or varied in the same manner that the flow output pattern is varied.

Using the various embodiments and implementations herein, interproximal cleaning of teeth can be substantially improved by easily varying the flow output pattern of the stream of liquid/air bursts during use based on the particular teeth structure of a user, thus providing the most effective and complete interproximal cleaning of teeth depending upon the particular shape, structure, or pattern of a user's teeth.

One example of a device for use in cleaning between teeth is a Sonicare AirFloss device available from Philips Oral Healthcare, Inc. The oral care device is based upon a microburst technology that delivers a quick burst of air and liquid to effectively yet gently clean between teeth. The oral care device is designed to remove dental plaque biofilms from the interdental areas between teeth to improve gingival health through the use of a stream of liquid/air bursts. In the embodiments disclosed herein, the nozzle includes a guidance tip that is configured to enable the user to adjust the flow output pattern of the stream of liquid/air bursts. The liquid/air bursts may consist of a dental cleaning liquid, mouthwash/rinse, medications, antimicrobial agents, or water, and the base or handle component can be configured to receive refills of these substances.

Generally in one aspect, an oral irrigator device for cleaning teeth is provided and includes: a system for producing a stream of liquid/air bursts; a nozzle connected to the system, and through which the stream of liquid/air bursts are directed, including: a guidance tip including a base portion, a tip portion, and an orifice, or exit opening, through which the stream of liquid/air bursts exits at a flow output pattern; and a flow output pattern selection mechanism connected to or positioned within the guidance tip, and configured to be selectively actuated and to vary, upon the actuation: the flow output pattern between a first flow output pattern to at least a second flow output pattern.

According to an embodiment, the first flow output pattern of the stream of liquid/air bursts has a first diameter at a first predetermined distance from the orifice, and the second flow output pattern of the stream of liquid/air bursts has a second diameter at the first predetermined distance from the orifice, where the first diameter is less than the second diameter.

According to an embodiment, the second diameter is greater than the first diameter.

According to an embodiment, the base portion is substantially circular in configuration.

According to an embodiment, the flow output pattern selection mechanism further includes a band concentrically positioned around the base portion and configured to be selectively circumferentially rotatable between a first position, where the first flow output pattern is selected, and at least a second position, where the second flow output pattern is selected.

According to an embodiment, the flow output pattern selection mechanism further includes a flexible tube concentrically positioned within the guidance tip through which the stream of liquid/air bursts are directed, and including an outlet portion with an outlet diameter that is configured to be decreased when the band is selectively circumferentially rotated from the second position to the first position; and increased when the band is selectively circumferentially rotated from the first position to the second position.

According to an embodiment, at least the outlet portion of the flexible tube is corrugated.

According to an embodiment, the flow output pattern selection mechanism further includes a flow regulator component positioned and moveable within the guidance tip, where the flow regulator component is configured to be moved toward the orifice when the band is selectively circumferentially rotated from the second position to the first position; and moved away from the orifice when the band is selectively circumferentially rotated from the first position to the second position.

According to an embodiment, the tip portion tapers to the orifice.

According to an embodiment, the flow regulator component is substantially cone-shaped comprising an apex portion where the apex portion is positioned towards the orifice.

According to an embodiment, the dental appliance further includes a handle portion connected to the nozzle, where the handle portion includes the system for producing a stream of liquid/air bursts.

Generally in one aspect, an oral irrigator device for cleaning teeth is provided and includes: a nozzle through which a stream of liquid/air bursts are directed for cleaning teeth, including a guidance tip including a base portion, a tip portion, and an orifice through which the stream of liquid/air bursts exits at a flow output pattern; and a flow output pattern selection mechanism connected to or positioned within the guidance tip, and configured to be selectively actuated and to vary, upon the actuation: the flow output pattern between a first flow output pattern to at least a second flow output pattern.

According to an embodiment, the second diameter is greater than the first diameter.

According to an embodiment, the base portion is substantially circular in configuration.

According to an embodiment, the flow output pattern selection mechanism further includes a band concentrically positioned around the base portion and configured to be selectively circumferentially rotatable between a first position, where the first flow output pattern is selected, and at least a second position, where the second flow output pattern is selected.

According to an embodiment, the flow output pattern selection mechanism further includes a flexible tube or ring concentrically positioned within the guidance tip through which the stream of liquid/air bursts are directed, and including an outlet portion with an outlet diameter that is configured to be: decreased when the band is selectively circumferentially rotated from the second position to the first position; and increased when the band is selectively circumferentially rotated from the first position to the second position.

According to an embodiment, at least the outlet portion of the flexible tube is corrugated.

According to an embodiment, the flow output pattern selection mechanism further includes a flow regulator component positioned and moveable within the guidance tip, where the flow regulator component is configured to be: moved toward the orifice when the band is selectively circumferentially rotated from the second position to the first position; and moved away from the orifice when the band is selectively circumferentially rotated from the first position to the second position.

According to an embodiment, the tip portion tapers to the orifice.

According to an embodiment, the flow regulator component is substantially cone-shaped including an apex portion where the apex portion is positioned towards the orifice.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of apparatus, systems, devices, and methods that use liquid/air bursts for dental cleaning. More generally, Applicants have recognized and appreciated that it would be beneficial to vary a flow output pattern of the liquid/air bursts provided through a dental appliance with a guidance tip for adjustable and dynamic interproximal cleaning of teeth. For example, effective interproximal cleaning of teeth can be substantially improved by varying the flow output pattern of the stream of liquid/air bursts based on the particular teeth structure of a user. This is particularly true in view of the wide variety of teeth shapes, structures, and patterns (e.g., narrow spacing vs. wide spacing), and thus the above-referenced adjustability provides a more effective and complete interproximal cleaning of teeth.

Embodiments disclosed herein provide an enhanced in-mouth experience through various flow output patterns using a nozzle with an adjustable feature. Embodiments disclosed herein allow users to adjust (e.g., dial, rotate, or any other mechanism) the setting to achieve different flow patterns for dental appliances using liquid/air bursts for dental cleaning. Different flow patterns may include jet or spray pattern of different volumes, or a combination of both.

A particular goal of utilization of the embodiments of the present disclosure is the ability of the embodiments of the flow output pattern selection mechanism to be used with any interproximal teeth cleaning device, including, e.g., a Philips AirFloss™ nozzle designs and other designs developed and manufactured by Koninklijke Philips Electronics, N.V.). Another goal is to satisfy the need to provide a different user experience as well as in-mouth applications (dictated, in part, by the unique structure/pattern of a user's teeth).

In view of the foregoing, various embodiments and implementations are directed to an apparatus and method in which a nozzle includes a guidance tip that is configured to interproximally position the nozzle orifice, and a flow output pattern selection mechanism configured to be selectively actuated to vary the flow output pattern of a stream of liquid/air bursts. In these embodiments, the dental appliance can also include a system component that provides a stream of liquid/air bursts of a predetermined size, length or volume and directs the stream of liquid/air bursts to the nozzle (which can preferably, but not necessarily, be including within a base or handle component), which is connected to the system component. These liquid/air bursts, which can be applied intermittently and/or at a predetermined rate, to clear and remove plaque, food, and other material stuck or otherwise lodged in the interproximal portions of teeth. The liquid/air bursts may consist of a dental cleaning liquid, mouthwash/rinse, medications, or water, and the base or handle component can be configured to receive refills of these substances.

Figure 1A:
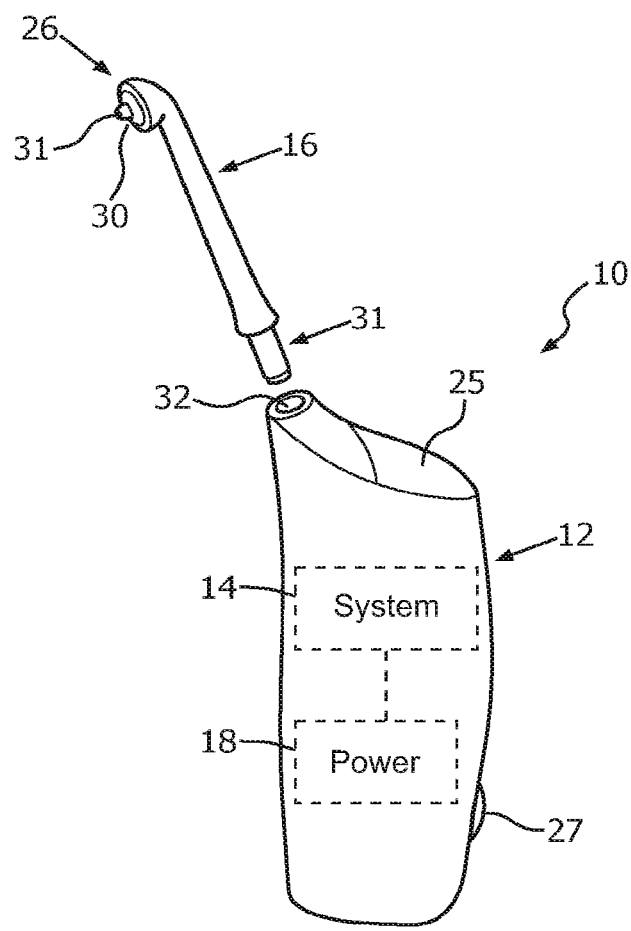
FIG. 1A is a perspective schematic representation of an oral irrigator device in accordance with an embodiment.

Referring to FIG. 1A, in one embodiment, an oral irrigator device 10 for cleaning teeth is provided. The oral irrigator device 10 in operation produces successive bursts of a liquid/air mixture. The succession (stream) of bursts is useful in cleaning the dental regions of a user, particularly the interproximal and gingival areas.

According to an embodiment, the oral irrigator device 10 includes a handle portion 12, that includes a system 14 for producing a stream of liquid/air bursts, and an extending nozzle 16 connected to the handle portion 12 through which the stream of liquid/air bursts are directed. The system 14 can be (but is not limited to being) located in a handle portion 12. As shown, nozzle 16 is relatively slim, in order to conveniently fit into the mouth of a user, for reaching all of the interproximal and gingival areas of the teeth. Nozzle 16 is preferably removably attachable to the handle portion 12 so that the nozzle 16 can be conveniently replaced and/or cleaned as necessary. The nozzle 16 terminates in a guidance tip 26 having a base portion 30, and an orifice 31, through which the successive bursts of liquid/air mixture are directed to the teeth. The orifice in the embodiment shown is approximately 1 mm in diameter, although this size can be varied. Further, guidance tip 26 preferably has a surface configuration to facilitate proper contact and placement of the guidance tip 26 in the interproximal areas of the teeth. The handle portion 12 also can also include an on/off switch 27 and a user interface 25 which when operated by the user controls or adjusts the bursts of liquid/air mixture. While the liquid will frequently be water, it should be understood that other liquids, such as mouthwash and medications, can also be utilized.

Figure 1B:
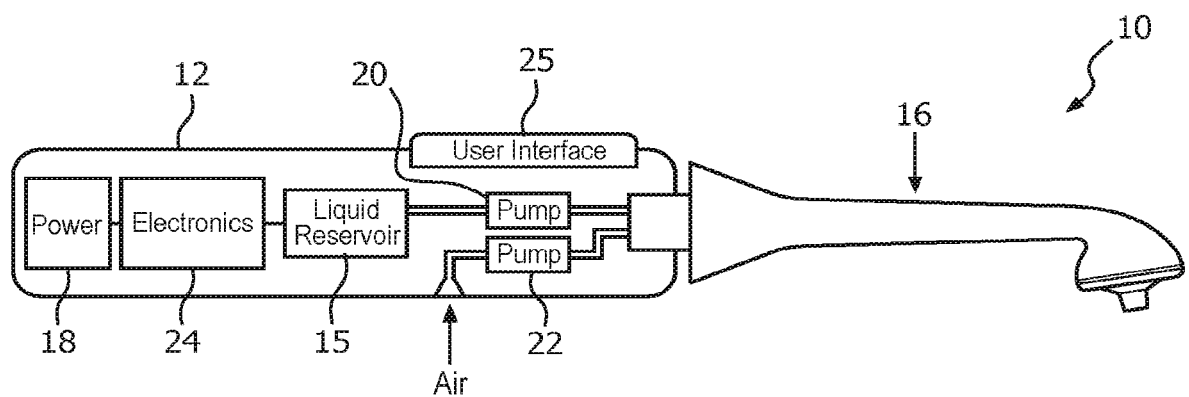
FIG. 1B is a perspective schematic representation of an oral irrigator device in accordance with an embodiment.

Referring to FIG. 1B, in one embodiment, a further detailed embodiment of the oral irrigator device 10 is provided. More particularly, in addition to the elements/components discussed with FIG. 1A, which will not be repeated here, additional components of system 14 will now be discussed. According to an embodiment, system 14 can include, but is not limited to, electronics 24, reservoir 15, delivery mechanism 20, and optional delivery mechanism 22, each of which can be located in the handle portion 12, and can be, but do not have to be, a pump. Alternatively, a single delivery mechanism can be used. According to an embodiment, liquid, such as water, from the reservoir 15 and air from the environment are directed to a nozzle 16 of the appliance by the delivery mechanism 20. The action of the appliance is controlled by a user interface 25. Power is supplied by a power assembly 18, such as a battery. The gas (air) stream and the liquid supplied from reservoir 15 are mixed to create liquid droplets and the system 14 accelerates the resulting liquid droplets through the channel 32 in nozzle 16 to exit the orifice 31 in the guidance tip 26 as shown in FIG. 1A, at a desired flow output pattern to a desired location on the teeth, in particular, the interproximal regions of the teeth.

In one arrangement, the liquid droplets can have a size range of 5 microns to 0.5 mm and can be accelerated to a velocity of approximately 50 meters per second. Other arrangements, however, with different size droplets and different velocities can be used. For example, the velocity of the liquid droplets can be increased in the range of 10-70 or even up to 200 meters per second.

Figure 2:
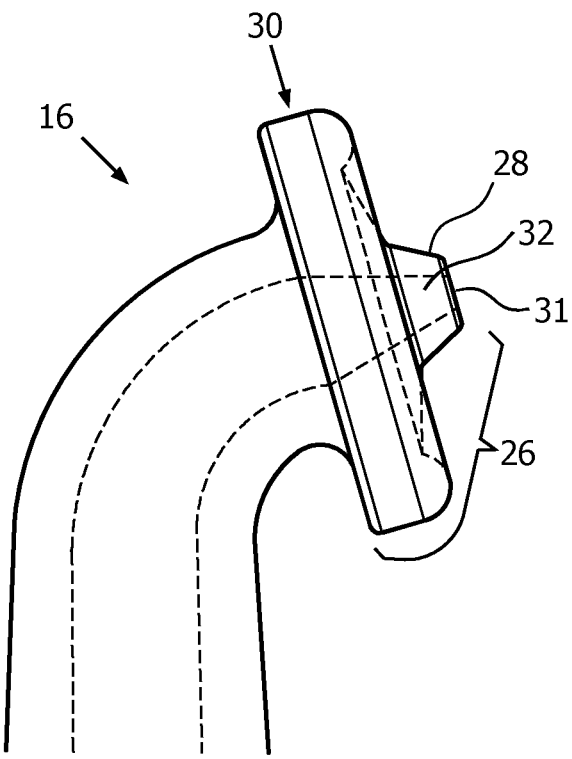
FIG. 2 is a side schematic representation of a guidance tip of a nozzle of an oral irrigator device, portions of which are shown in cross section, for clarity of the guidance tip in accordance with an embodiment.
Figure 3:
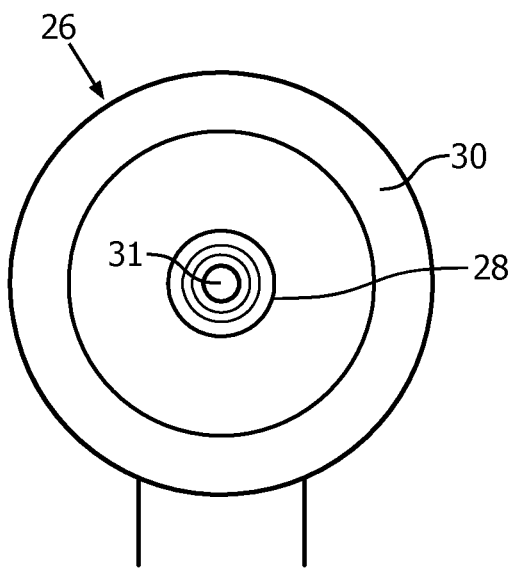
FIG. 3 is a front schematic representation of the guidance tip of FIG. 2 in accordance with an embodiment.

Referring to FIGS. 2-3, in one embodiment, a guidance tip 26 of the nozzle 16 is shown. According to an embodiment, a guidance tip 26 of nozzle 16 includes a tip portion 28 and a base portion 30. The tip portion 28 includes an orifice 31 for exit of the liquid/air burst. The orifice 31 can typically be 1 mm in diameter, but this could be varied to some extent.

The outside diameter of the tip portion 28 at the forward end thereof is preferably approximately 2 mm. The nozzle 16 for the oral irrigator device 10 is configured and arranged to both correctly orient the tip portion 28 on the teeth and also to position tip portion 28 so that the burst from the orifice 31 is directed preferably precisely along the interproximal gap between the teeth for effective cleaning thereof.

According to an embodiment, the length of tip portion 28 can typically be in the range of 1-3 mm, but can preferably be approximately 2.75 mm. The tip portion 28 in an embodiment shown has a slight inward taper from the proximal end thereof, although this is not essential. The configuration of tip portion 28, including the length and diameter thereof are designed to provide good guidance for the liquid/air bursts into the interproximal spaces, particularly for the back teeth, which are more difficult for the user to see, but also for the teeth closer to the front. Typically, tip portion 28 is made from hard plastic to provide the desired guidance effect. However, the tip portion could be of softer material.

The base portion 30 of the guidance tip 26 in the embodiment shown is typically circular, with a diameter preferably in the range of 8-16 mm, with approximately 12 mm being most preferable. The thickness (rear to front) of base portion 30 in an embodiment shown can approximately be 2 mm. The base portion can typically be made of a soft elastomeric material, such as rubber. The base portion 30 can taper slightly forwardly to where it contacts tip portion 28, as shown in FIG. 2.

The configuration and size of the base portion 30 can be important to provide points of contact as far apart as possible with those teeth adjacent to the interproximal space being cleaned yet still be comfortable within the mouth, as well as providing contact with the adjacent gum region. Such an arrangement provides stability for the guidance tip 26 against the teeth and gum region adjacent the interproximal space to be cleaned. It is the base portion 30 of the guidance tip 26 which provides the basic alignment of the tip portion 28 relative to the interproximal regions. When base portion 30 is positioned securely against the teeth and the adjacent gum region, the tip portion 28 can preferably be precisely aligned with the interproximal space, providing effective cleaning thereof. The base portion 30 can thus provide a passive, safe and stable structure for producing the necessary precise alignment of the tip portion 28 on the teeth so that the liquid/air bursts can be directed effectively into the interproximal space.

As shown in the embodiment shown in FIGS. 2-3, the orifice 31 has a centerline which can be aligned with the plane of the interproximal space; the opening centerline further is parallel to the occlusal plane; the opening centerline can approximately be 1.5 mm from the gum at the interproximal site; and the plane of the free end of the tip portion 28 can approximately be at most 1.5 mm from the projected tooth contact surface of the 1.0 mm diameter orifice 31.

According to an embodiment, while the base portion 30 of the nozzle 16 is preferably circular, it could be other shapes, including rectangular or triangular, as long as there is good contact between the base portion and the adjacent teeth and gums of the user. In addition, it should be understood that the contact surface of the base portion 30 might not be continuous, i.e., it could include bumps or bristles or even fingers which produce the contact with the teeth and gum surfaces. It is important, however, that the base portion 30 make a good, stable contact with the teeth and gums so as to provide a reliable positioning of the tip portion 28 relative to the interproximal space to be cleaned.

Figure 4:
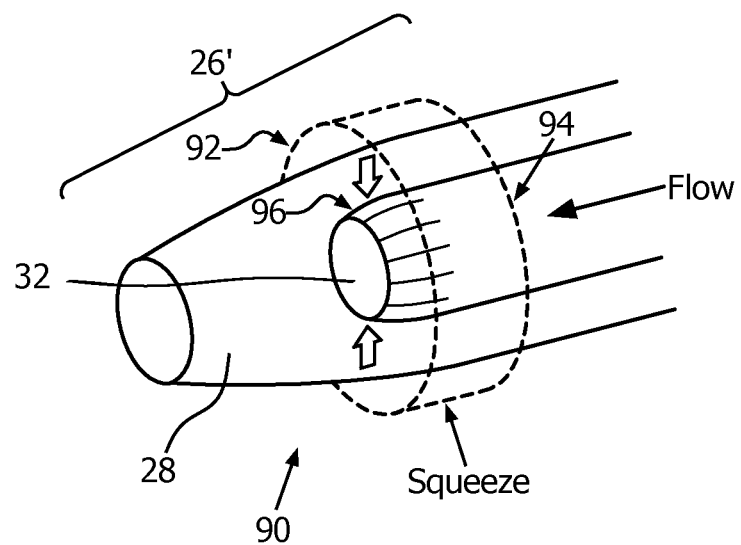
FIG. 4 is a side schematic representation of a nozzle of an oral irrigator device in accordance with an alternative embodiment.
Figure 5:
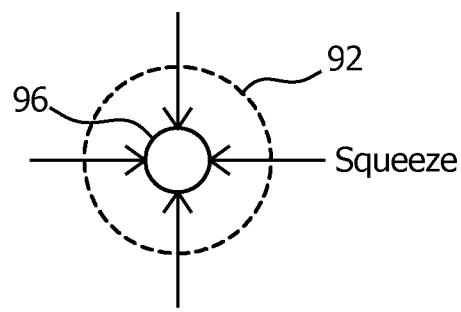
FIG. 5 is a front schematic cross-sectional representation of the guidance tip of the nozzle of FIG. 4 in accordance with an alternative embodiment.

Referring to FIGS. 4-5, in one embodiment, a guidance tip 26' of the nozzle 16 with a flow output pattern selection mechanism 90 is shown. According to an embodiment, flow output pattern selection mechanism 90 includes a band or ring 92 that can fit around and connect to or replace base portion 30 (not shown). Alternatively, the flow output pattern selection mechanism can include, but is not limited to, any device (mechanical or electrical) which performs the functionality of the band or ring 92 described herein and illustrated in the referenced Figures. For example, alternative embodiments can include the following attached to the nozzle 16 or guidance tip 26: a lever, a separate element that slides along the longitudinal axis of the nozzle 16 or guidance tip 26, a button or a switch.

Channel 32 is concentrically positioned within the nozzle 16 to guidance tip 26' through which the stream of liquid/air bursts are directed. Per a rotation of band 92 (for example, in a clockwise direction), channel 32 is configured to be squeezed, narrowing its diameter. A rotation of band 92 in the opposite direction releases the pressure on channel 32, and the diameter of channel 32 is configured to become comparably larger. In one embodiment, the channel 32 includes a corrugated outlet portion 96 with an outlet diameter that is configured to be decreased when band 92 is rotated in one direction from a first position to a second position, and increased when band 92 is rotated in the opposite direction. The decrease/increase in the outlet diameter is adjustable along an entire range of positions (i.e., smaller or larger outlet diameter) as a result of the rotation of the band 92 from the first position to the second position and vice versa.

Figure 6:
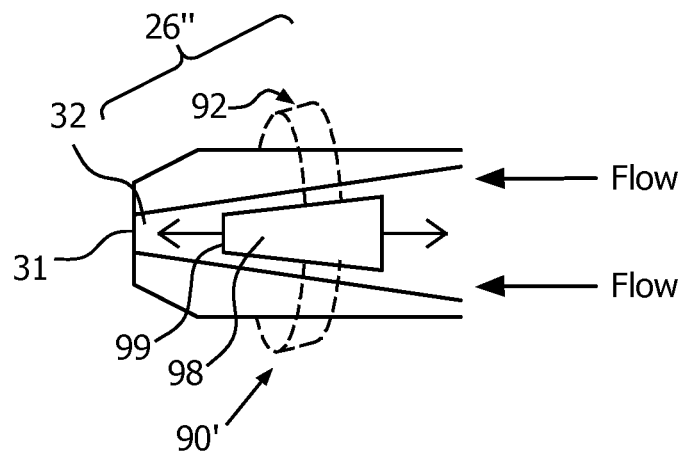
FIG. 6 is a perspective schematic representation of a guidance tip and a flow output pattern selection mechanism of a nozzle of an oral irrigator device, portions of which are shown as transparent, for clarity of the flow output pattern selection mechanism in accordance of an embodiment.
Figure 7:
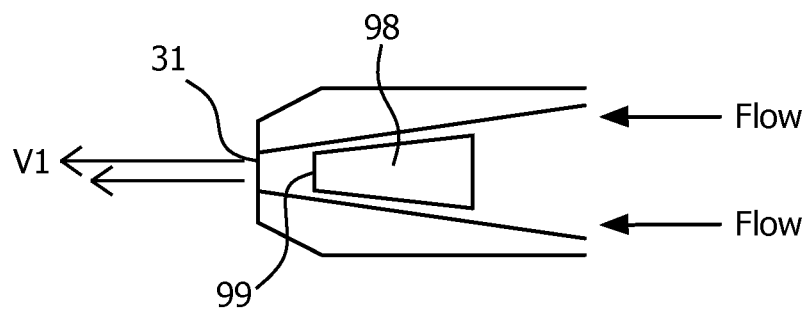
FIG. 7 is a side schematic representation of the guidance tip and the flow output pattern selection mechanism of FIG. 6 in accordance of an embodiment.
Figure 8:
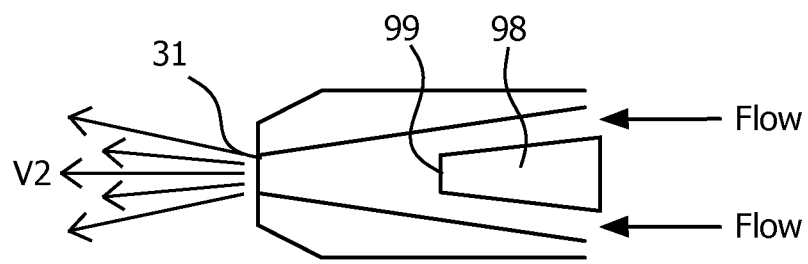
FIG. 8 is a side schematic representation of a guidance tip and a flow output pattern selection mechanism of a nozzle of an oral irrigator device, portions of which are shown as transparent and in a cross-sectional view, for clarity of the flow output pattern selection mechanism in accordance of an embodiment.

Referring to FIGS. 6-8, in one embodiment, a guidance tip 26" of the nozzle 16 with a flow output pattern selection mechanism 90' is shown. According to an embodiment, flow output pattern selection mechanism 90' includes a band or ring 92 that can fit around and connect to or replace base portion 30 (not shown). Flow output pattern selection mechanism 90' can also include a flow regulator component 98 positioned and moveable within the channel 32 of guidance tip 26". The flow regulator component 98 is configured to be moved toward the orifice when the band 92 is rotated from a first position to a second position; and moved away from the orifice when the band 92 is rotated in the opposite direction (see FIGS. 7-8, neither band 92 nor base portion 30 is shown here for clarity purposes only to fully show the movement of flow regulator component 98). The movement of the flow regulator component 98 toward and away from the orifice is adjustable along an entire range of positions (i.e., closer to and away from the orifice) as a result of the rotation of the band 92 from the first position to the second position and vice versa. In one embodiment, the flow regulator component 98 is substantially cone-shaped and includes an apex portion 99 where the apex portion is positioned towards the orifice 31.

Figure 9:
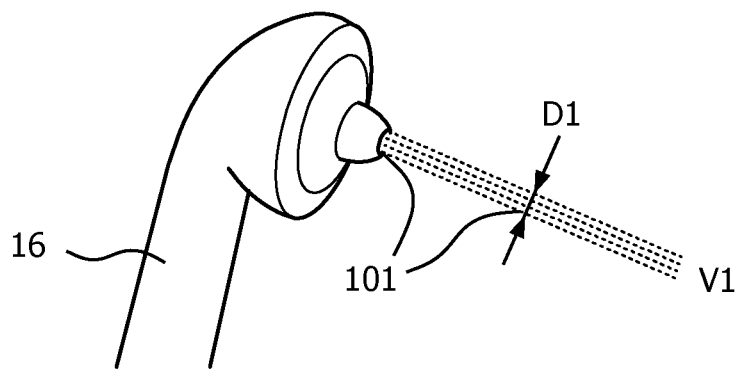
FIG. 9 is a perspective schematic representation of the guidance tip and a flow regulator component of the flow output pattern selection mechanism of FIG. 7 in accordance of an embodiment.
Figure 10:
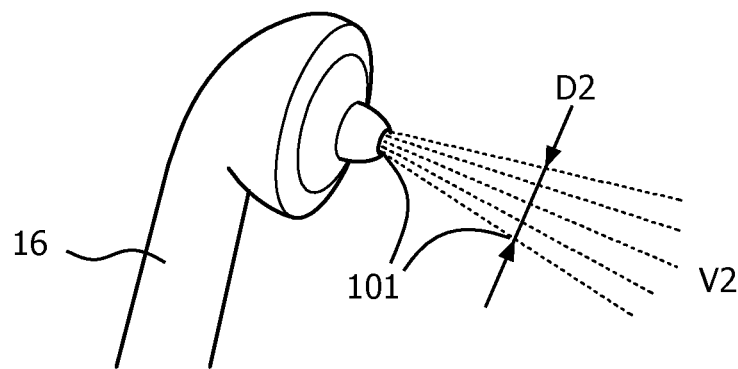
FIG. 10 is a perspective schematic representation of the guidance tip and a flow regulator component of the flow output pattern selection mechanism of FIG. 8 in accordance of an embodiment.
Figure 11:
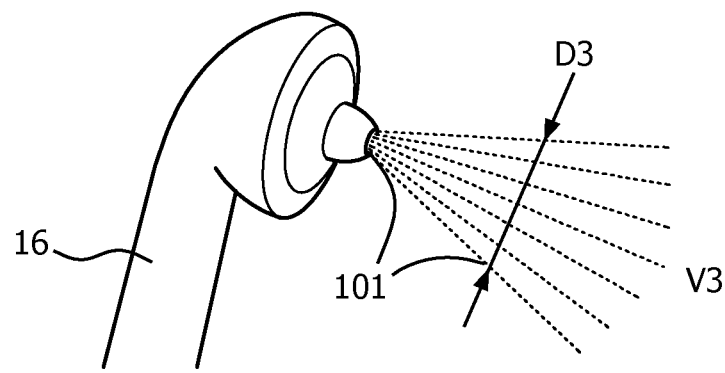
FIG. 11 is a perspective schematic representation of a guidance tip of a nozzle of an oral irrigator device with a particular flow output pattern in accordance of an embodiment.

Referring to FIGS. 9-11, a general representation of the guidance tip of the nozzle 16 is shown. According to an embodiment, FIGS. 9-11 show the resulting flow output patterns pursuant to the selected adjustment (e.g., rotation of band 92) made to the embodiment of the flow output pattern selection mechanisms 90 and 90', such as those shown in FIGS. 4-8. The rotation of the band 92 in either direction can result in a "click" per rotation configured to result in one flow output pattern vs. another, and indicated to the user (audibly or tactilely) regarding the same. Alternatively, the rotation of the band can be a smooth rotation without any "click." As shown, diameter D1 (showing a jet flow output pattern) is less than diameter D2, and diameter D2 is less than diameter D3 (showing a spray output pattern). Additional diameters are contemplated; illustrative examples are shown and described herein. Comparatively speaking, a smaller opening (D1) will result in a longer jet and less spray. This means a more localized (and locally effective) cleaning. A larger opening (D2), on the other hand, will result in a flow pattern that is more spray-like, because of a decreased liquid/air ratio. Treatment with the larger opening will be gentler and cover larger areas.

During operation of the oral irrigator device 10, for example, with respect to flow output pattern selection mechanism 90 shown in FIGS. 4-5, the band 92 can be rotated in a first direction to squeeze (to exert complete circumferential pressure) and effectively narrow the flexible tube 94 from a diameter in a fully relaxed/open condition to a most narrow diameter without being fully closed. When system 14 produces a stream of liquid/air bursts per user actuation of the user interface 25, a resulting flow output pattern of the stream of liquid/air bursts shown in FIG. 9 is produced with a first diameter D1 at a first predetermined distance 101 from the orifice. When the band 92 is rotated back in the opposite direction (but not fully rotated in the opposite direction), the band relaxes some of the pressure exerted on the flexible tube 94 therefore expanding the diameter of the flexible tube. A resulting flow output pattern of the stream of liquid/air bursts shown in FIG. 10 is produced with a second diameter D2 at the first predetermined distance 101 from the orifice. When the band 92 is further rotated in the opposite direction (fully rotated in the opposite direction), the band completely relaxes the pressure exerted on the flexible tube 94 to expand the diameter of the flexible tube to its fully relaxed/open diameter. A resulting flow output pattern of the stream of liquid/air bursts shown in FIG. 11 is produced with a third diameter D3 at the first predetermined distance 101 from the orifice. Due to the adjustability of the size of the outlet diameter along an entire range of positions as a result of the rotation of the band 92 from one position to another and vice versa, as described above, the diameter of a resulting flow output pattern of a stream of liquid/air bursts is also adjustable along an entire spectrum as a result of the rotation of the band 92 from the first position to the second position, and from the second position to the third position, and vice versa.

During operation of the oral irrigator device 10, for example, with respect to the flow output pattern selection mechanism 90' shown in FIGS. 6-8, the band 92 can be rotated in a first direction to move flow regulator component 98 to a position closest to the orifice 31 without fully blocking the orifice (see FIG. 7). When system 14 produces a stream of liquid/air bursts per user actuation of the user interface 25, a resulting flow output pattern of the stream of liquid/air bursts shown in FIG. 9 is produced (with the stream moving around the flow regulator component as shown in FIG. 7) with a first diameter D1 at a first predetermined distance 101 from the orifice. When the band 92 is rotated back in the opposite direction, the flow regulator component 98 moves to a position away from the orifice 31 (see FIG. 8) therefore allowing a larger stream of liquid/air bursts to pass by the flow regulator component 98 and exit the device at the orifice 31. A resulting flow output pattern of the stream of liquid/air bursts shown in FIG. 11 is produced with a third diameter D3 at the first predetermined distance 101 from the orifice. The flow regulator component can also be positioned to produce liquid/air bursts shown in FIG. 10 with a second diameter D2 at the first predetermined distance 101 from the orifice. Due to the adjustability of the movement of the flow regulator component 98 toward and away from the orifice as a result of the rotation of the band 92 from one position to another and vice versa, as described above, the diameter of a resulting flow output pattern of a stream of liquid/air bursts is also adjustable along an entire spectrum as a result of the rotation of the band 92 from the first position to the second position, and from the second position to the third position, and vice versa.

In an alternative embodiment, the exit velocity can also be adjusted or varied in the same manner that the flow output pattern can be varied (i.e., per the use of the flow output pattern selection mechanisms 90, 90' as described herein). As shown in FIGS. 9, 10, and 11, the exit velocity can be varied from a first exit velocity V1, to at least a second exit velocity V2, and to a third velocity V3, and vice versa (each of which is measured at the same predetermined distance as illustrated, for example, for D1, D2, and D3, respectively). Velocity V1 can be larger than velocity V2, and velocity V2 is can be larger than velocity V3. However, these relative sizes of the velocities can be different, based on liquid/air fraction and on total burst time. If, for example, burst time stays constant, then the average velocity can be larger for comparatively smaller diameters. Additional velocities are contemplated.

All definitions, as defined and used herein, should be understood to control over dictionary definitions, definitions in documents incorporated by reference, and/or ordinary meanings of the defined terms.

What is claimed is:

1. A nozzle for use on an oral irrigator device, comprising:
   a channel concentrically positioned within the nozzle through which a stream of liquid and air bursts are configured to be directed, wherein the channel comprises a wall to direct the stream of liquid and air bursts;
   a guidance tip including a base portion, a tip portion, and an orifice through which the stream of liquid and air bursts are configured to exit at a flow output pattern, wherein the guidance tip further includes first and second ends and the wall of the channel extends between the first and second ends of the guidance tip; and
   a flow output pattern selection mechanism connected to or positioned within said guidance tip, and configured to be selectively actuated and to vary, upon said actuation:
   the flow output pattern between a first flow output pattern to at least a second flow output pattern;
   wherein said base portion is substantially circular in configuration and directly contacts said tip portion, said base portion having an outer perimeter that is radially outward of said tip portion, and said flow output pattern selection mechanism further comprises a band concentrically positioned around said base portion and configured to be selectively circumferentially rotatable between a first position, wherein said first flow output pattern is selected, and at least a second position, wherein said second flow output pattern is selected;
   wherein said wall of the channel further comprises an outlet portion with an outlet outside diameter that is configured to be:
   squeezed such that the outlet outside diameter is decreased when said band is selectively circumferentially rotated from said second position to said first position; and released such that the outlet outside diameter is increased when said band is selectively circumferentially rotated from said first position to said second position; and wherein the flow output pattern selection mechanism further includes a flow regulator component positioned and moveable within the channel, wherein said flow regulator component is configured to be: moved away from said orifice when said band is selectively circumferentially rotated from said first position to said second position; and moved towards said orifice when said band is selectively circumferentially rotated from said second position to said first position.

2. The nozzle of claim 1, wherein said first flow output pattern of the stream of liquid and air bursts has a first diameter at a first predetermined distance from said orifice, and said second flow output pattern of the stream of liquid and air bursts has a second diameter at the first predetermined distance from said orifice, wherein said first diameter is less than said second diameter.

3. The nozzle of claim 1, wherein at least said outlet portion of the wall of said channel is corrugated from a first end of the channel and ending at a point before a second end of the channel.

4. An oral irrigator device for cleaning teeth, comprising:

a handle portion containing a system for producing a stream of liquid and air bursts; and a nozzle according to claim 1, wherein the nozzle is connected to said handle portion.

5. The nozzle of claim 1, wherein said flow regulator component is cone-shaped comprising an apex portion wherein said apex portion is positioned towards said orifice.

6. The nozzle of claim 1, wherein the outlet portion of the wall of the channel is divided into a plurality of segments at the first or second end of the guidance tip and each of the plurality of wall segments is configured to deform toward a central axis of the channel.

7. The nozzle of claim 1, wherein the base portion has a first outer diameter and the tip portion has a second outer diameter and the first outer diameter of the base portion is at least four times the second outer diameter of the tip portion.

8. The nozzle of claim 1, wherein the wall of the channel comprises a continuous taper between the first and second ends of the guidance tip.

\* \* \* \* \*